Feb. 9, 1926.

W. PATERSON

FILTERING APPARATUS

Filed Feb. 4, 1925

Inventor
W. Paterson
By Marks & Clerk Attys.

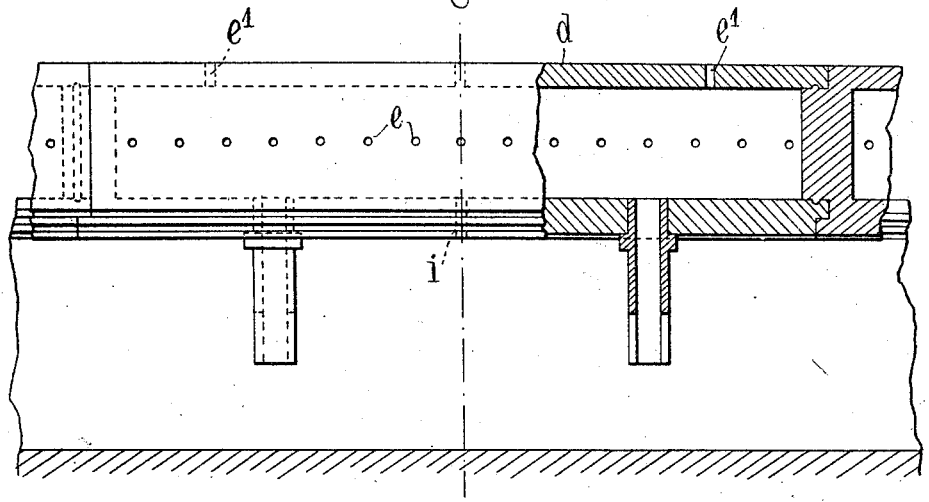
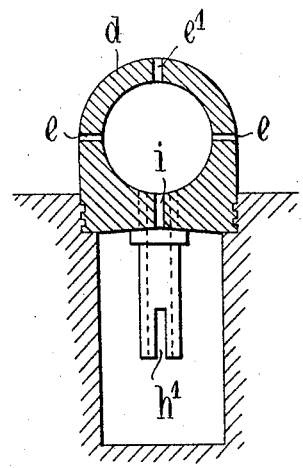

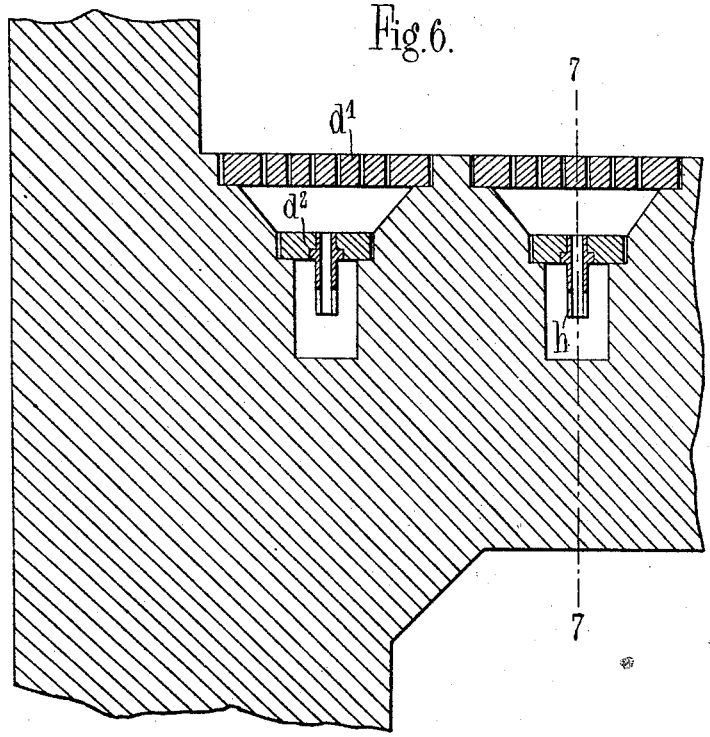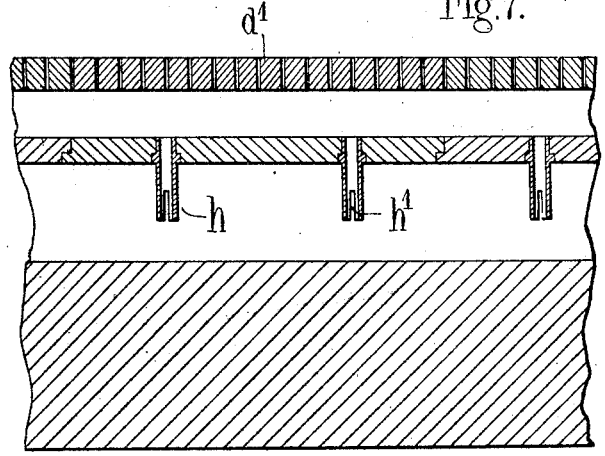

Patented Feb. 9, 1926.

1,572,076

UNITED STATES PATENT OFFICE.

WILLIAM PATERSON, OF LONDON, ENGLAND.

FILTERING APPARATUS.

Application filed February 4, 1925. Serial No. 6,883.

*To all whom it may concern:*

Be it known that I, WILLIAM PATERSON, a subject of the King of Great Britain and Ireland, and residing at Windsor House, Kingsway, London, W. C. 2, England, have invented certain new and useful Improvements in Filtering Apparatus (for which I have filed an application in Great Britain, No. 2,382, dated January 29, 1924), of which the following is a specification.

This invention relates to filtering apparatus with more particular reference to what are known as "rapid filters" which are provided with under-drains or collecting and distributing systems for collecting the filtered water and for distributing the washwater employed for cleansing the filter bed.

In both the collecting and distributing operations it is essential that the water should be drawn off and applied during the washing process at as uniform a rate as possible throughout the whole area of the filter bed while the system must be of such a character as to withstand the fairly considerable pressure under which the washwater is applied at the point of entry. For this purpose the strainer system usually consists of more or less elaborate metallic pipe constructions connected to distributing and collecting members sometimes furnished with spray or discharge nozzles set at uniform intervals.

The object of the present invention is to effect improvements in the collecting and distributing systems of filtering apparatus which will render the same clean and hygienic, not subject to deterioration or corrosion and at the same time capable of giving a much more uniform collection of the filtered water and distribution of the washwater than is obtainable with the systems hitherto adopted.

The invention consists in filtering plant or apparatus provided with a collecting and distributing system comprising a series of channels in the concrete or other foundation of the filter serving as distributing or collecting headers and hollow tiles, tubes or like collecting and distributing members cemented or otherwise secured in said channels and having restricted openings in their under sides for establishing communication with the main channels and perforated upon their upper and outer surfaces for securing an even distribution over the whole area of the filter bed.

The invention also consists in other details and arrangements hereinafter described or indicated.

The accompanying drawings illustrate several modes of carrying out the invention.

Figure 1 is a part sectional elevation of a portion of apparatus in accordance with the invention, and Figures 2 and 3 are sections on the lines 2—2 and 3—3 respectively.

Figures 4 and 5 are two views showing a modification, and

Figure 6 shows a further modification, while

Figure 7 is a section on the line 7—7 of Figure 6.

Figure 3:
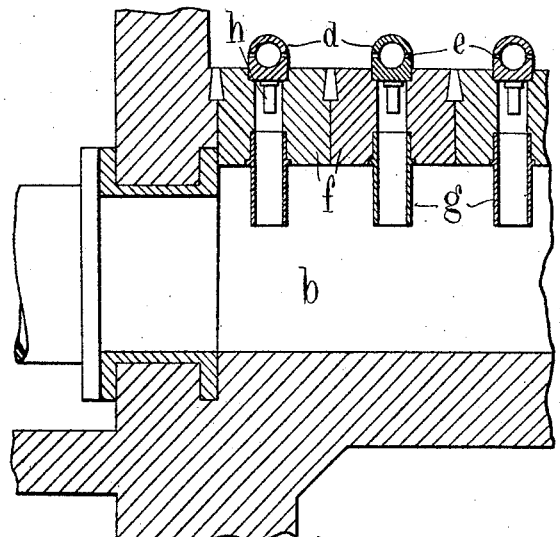
Figure 1:
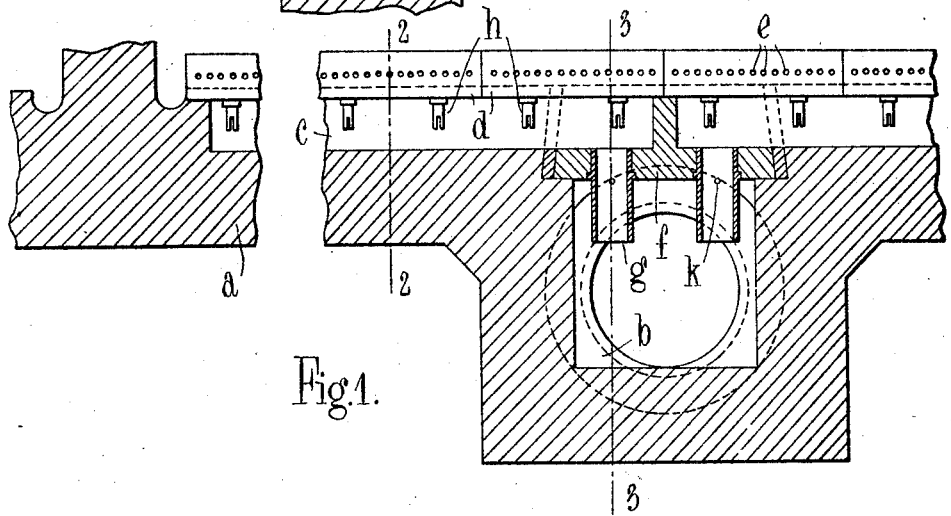
Figure 2:
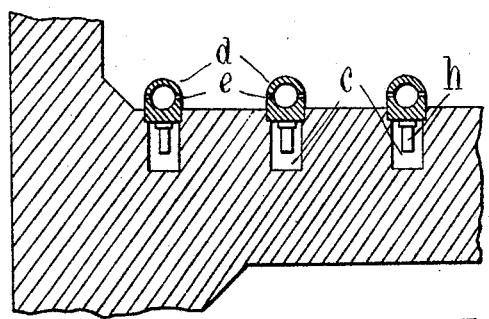

In carrying my invention into effect in one convenient manner I may form the bed or foundation $a$ for the filter plant from concrete, ferro-concrete or the like and in such concrete or like foundation I provide one or more main channels $b$ and with side branch channels $c$ leading into same. These side branch channels are preferably as numerous as is convenient in order to ensure the maximum uniformity of distribution and extend across the filter bed. Each of such channels is rebated or recessed or otherwise suitably formed to take the hollow tiles $d$, tubes or the like or a series of such members, the members being secured in position by cementing or otherwise or being anchored by suitable means, or being secured in any other convenient manner such that they may withstand the pressure at which the washwater is applied to the points of entry. Under the under side of each tile or like member, which is formed of fireclay, porcelain, cement or other suitable material, I provide a series of relatively small or restricted apertures serving to allow of the egress of filtered water from the members into the channels during the collecting operation or the ingress of wash-water from the channels into the members during the distributing operation. Each of such tiles or like members is preferably made curved upon its upper and outer surfaces and such surfaces are perforated with a relatively large number of small apertures $e$ and by this means I am enabled to secure a very uniform distribution of wash-water while at the same time the whole construction is such that the under-drain system is clean and hygienic and is not liable to deterioration.

The main collecting channel $b$ may be covered by slabs $f$ of concrete or similar material which are so formed and spaced as to permit of the continuance of the line of distributing hollow tiles just referred to right across the space to join up with those in the side branch channels on the other side of the main channel and so form a continuous line the full width of the tank.

It will be understood that the invention is not to be confined to any particular material from which the tiles or like members are formed nor to any particular shape, formation or method of securing of such members.

When a series of members are employed for one channel such may be jointed by ordinary spigot joints or by means of interconnecting plugs or by other suitable means, care being taken that the joints are such that they will be rendered fluid-tight even under the pressure at which the wash-water is applied. Each tile may be sealed at one end so as to have a spigot formation and open at the other end so as to form a faucet so that when these tiles are joined up in line they are sealed at both ends so that the distribution of the wash-water effected by the restricted orifices on the under side is confined to the length of the tile and so uniformity of distribution is effected.

Each tile or like member may be formed as an integral whole or it may be made in two or more parts as, for example, the plain bottom portion may be in one piece while the upper curved portion may be in another piece, and in any modification of the invention stirrups or other means may be adopted for anchoring the tubular or like members in position upon the channels.

The channels in the filter bottom or foundation may be combined with the tile members, as shown in Figures 6 and 7, where the tile members $d'$ consist of perforated flat slabs laid across the channels, as shown, the slabs $d^2$ with the restricted orifices therein forming the lower parts of such tile members.

It may be desirable to arrange the system as described to be utilized for the uniform distribution of air as well as wash-water. I may effect this uniform distribution of air by constructing the restricted discharge orifices with extended shanks $g$, $h$ so that they may be sealed by the water in the channel underneath. With this construction when the air is turned on into the main channel and side branch channels it will depress the water which is free to escape through the submerged orifices, one or two small perforations $i$ on the under side of the tiles or $h$ at the root of the extended shank permitting a small escape of air in the initial stages of the process of applying the air and permitting the complete venting of the system from air and so avoiding the formation of air pockets when the wash-water is applied later. Moreover, in any modification the shank members $h$ may be slotted for a part of their length, as shown at $h'$.

I may prefer to have the bulk of the perforations in the hollow tiles arranged on either side, as shown at $e$, with one or two perforations $e'$ (Figures 4 and 5) on the top surface so that when the applied air has reached the inside of the hollow tile it has to depress the water underneath before escaping uniformly through the side perforations. Here, again, one or two perforations on the top of the tile will prevent the formation of air pockets.

Having now described my invention, what I claim as new and desire to secure by Letters Patent is:—

1. A filtering apparatus provided with a collecting and distributing system comprising a foundation having a series of channels therein constituting distributing and collecting headers, said foundation also having a main channel communicating with the channels of the series, collecting and distributing members secured in said channels having restricted openings in their under sides for establishing communication with the channels and perforated upon their upper and outer surfaces for securing an even distribution over the whole area of the filter bed.

2. A filtering apparatus provided with a collecting and distributing system comprising a foundation having a series of channels therein constituting distributing and collecting headers, said foundation also having a main channel communicating with the channels of the series, collecting and distributing members secured in said channels having restricted openings in their under sides for establishing communication with the channels and perforated in their upper and outer surfaces for securing an even distribution over the whole area of the filter bed, said restricted openings having extended shanks.

3. An apparatus as claimed in claim 2 characterized in that the extended shanks are provided in their side walls with passages.

In testimony whereof I have signed my name to this specification.

WILLIAM PATERSON.